May 15, 1945.    S. W. BRIGGS    2,375,765
FILTER UNIT
Filed Sept. 20, 1939    2 Sheets-Sheet 1

Inventor
SOUTHWICK W. BRIGGS
By Semmes, Keegin & Semmes
Attorneys

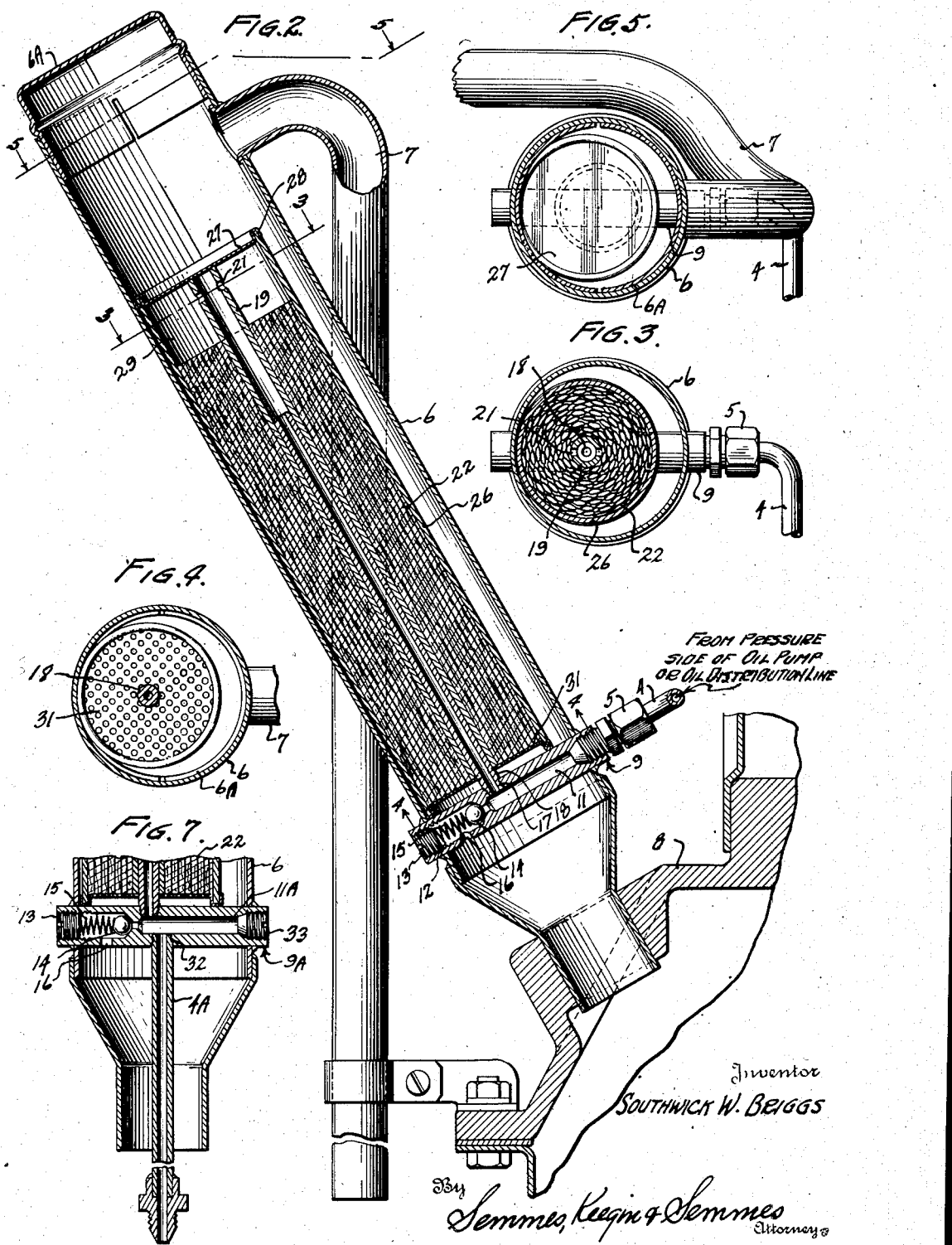

Patented May 15, 1945

2,375,765

UNITED STATES PATENT OFFICE 2,375,765

FILTER UNIT

Southwick W. Briggs, Washington, D. C., assignor to Briggs Clarifier Company, Washington, D. C., a corporation of Delaware Application September 20, 1939, Serial No. 295,827

6 Claims. (Cl. 123—196)

This invention relates to filtration, and more particularly has reference to a filter for the oil in a lubrication system of an internal combustion engine.

The desirability of filtering the lubricating oil in an internal combustion engine is of course well recognized. However, the filters heretofore available have been open to certain objection, principally arising out of the initial cost of the filter, the replacement cost of the filtering element, and the fact that there is usually a decided limitation of space, particularly where the internal combustion engine is a power plant for an automobile.

To overcome the above disadvantages is one of the objects of my invention.

Another object of my invention is to provide a filter that may be incorporated with one of the existent elements of an internal combustion engine without impairing the normal function of such element.

A still further object of my invention is to provide an oil filter element for an internal combustion engine which may be replaced with a minimum of expense and effort.

To accomplish the above, and other important objects which will more fully appear hereinafter, my invention in general embraces the concept of an inexpensive filtering element which may be placed in the circulatory lubricating system of an internal combustion engine and so located as to add no over all space requirements for the engine. More particularly, the filtering element is located within one of the usual parts of an engine which communicates with the crank case, the filtering element being of such construction that it does not impair the operation of such member.

In the preferred embodiment of my invention, the filtering element possesses a maximum filtering capacity for its size, its size and general construction being such that it is positioned in an oil filler tube of an internal combustion engine without interfering with the replenishing of oil to the crank case or the function which such a tube serves in permitting a breathing of the crank case. In such a position, the filtering element is supplied with crank case oil by means of the oil pump and discharges the filtered oil directly into the filler tube from whence it passes into the crank case.

To aid in the understanding of my invention, I have shown in the accompanying drawings one specific embodiment of my invention, but it will of course be appreciated that various changes may be made therein without exceeding the scope of my inventive concept. In these drawings, in which similar numerals refer to the same parts:

Figure 2 is a vertical sectional view of the filter tube of my invention in assembled position.

Figure 3 is a view along the line 3—3 of Figure 2, looking in the direction of the arrows.

Figure 4 is a view along the line 4—4 of Figure 2, looking in the direction of the arrows.

Figure 5 is a view along the line 5—5 of Figure 2, looking in the direction of the arrows.

Figure 7 is a modified form of feed line for the filter element.

Figure 1:
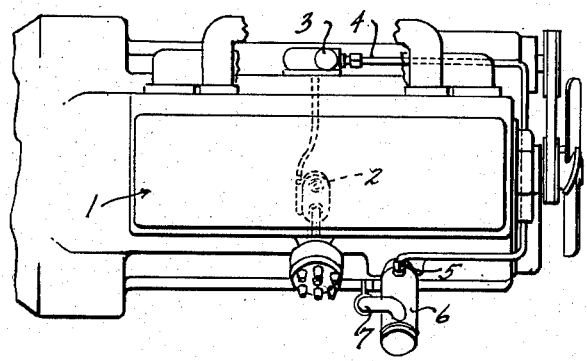
Figure 1 is a diagrammatic sketch of an internal combustion engine when equipped with my invention.

While my invention of course is adapted for use with practically any type of internal combustion engine, I have shown diagrammatically in Figure 1 an arrangement for one type of engine. In this figure, the numeral 1 indicates a cylinder block beneath which is the conventional crank case. The crank case carries the usual oil pump 2 and, in the case of Figure 1, the oil picked up by pump 2 is sent to a distribution valve 3. Taken off from the distribution valve 3 is the pipe 4 which carries the oil to a connection 5 at the oil filler tube 6. The oil filler 6 is provided with the usual breather tube 7.

While Figure 1 depicts a motor in which an oil distribution valve is employed, it will of course be obvious that such a valve is not essential, and a line corresponding to the line 4 may be tapped in directly to the pressure side of an oil pump or into an oil distribution line. As a matter of fact, Figure 7, as will be hereinafter indicated, depicts a modified form of feed element for the filter where a distribution valve is not employed.

Referring particularly to Figure 2, it will be noted that the oil filler tube 6 is mounted near the top of the crank case 8. Traversing the filler tube 6 near its base is a channelled member 9 which is secured in the tube 6 by welding, brazing, or in some other convenient manner. The member 9 receives the connection 5 in the oil line 4, and the member 9 is provided with a chamber 11 into which the oil initially passes. The chamber 11 is connected with a second chamber 12 in the member 9, the chamber 12 being closed at one end by threaded plug 13 and at its opposite end it serves as a seat for a check valve 14 which is held in the seat by means of the spring 15. An aperture 16 permits the discharge of any oil from chamber 12 to the filler tube 6, from whence such oil may fall into the crank case. It will be noted of course that the tension on spring 15 may be controlled by the plug 13, but when the pressure in chamber 11 for any reason exceeds the tension of that spring, the ball valve 14 will be un-seated and a quantity of the oil will be returned to the crank case until the pressure of the oil in the chamber 11 drops sufficiently for a re-seating of valve 14.

A threaded aperture 17 is drilled into the top of chamber 11, and this aperture receives a section of tubing 18. One end of the tubing 18 is screw-threaded to engage the threaded aperture 17.

The tube 18 serves in effect as a quill for a filter cartridge and introduces oil to such element from the chamber 11.

The filter cartridge consists of a tube 19 having an inside diameter substantially the same as the outside diameter of the quill 18 so that it may frictionally fit over such quill and be held securely thereon. It will be noted that the tube 19 is longer than the quill 18, and near the top of the tube 19 apertures 21 are provided, so that oil from the quill 18 may flow through such apertures 21.

Figure 6:
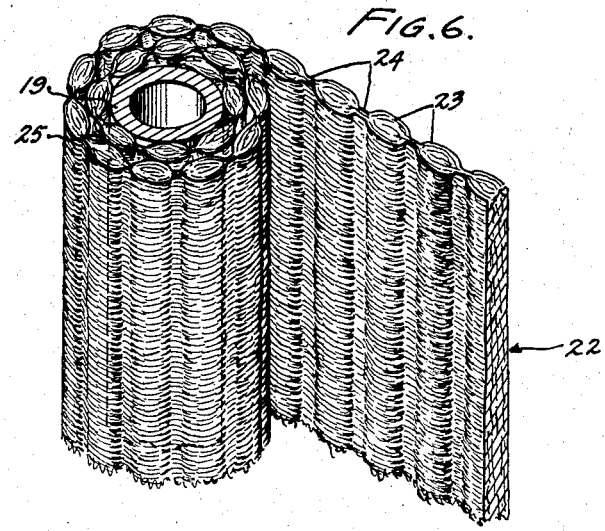
Figure 6 is a detailed view of the preferred filtering material for my filter element.

While the precise filtering material may be of varied construction, I have found that a ribbed cellulosic sheet, such as disclosed in Figure 6, is particularly advantageous in that it affords a maximum filtering action within a minimum of space, a feature which is obviously of real importance in the present invention. As best shown in Figure 6, the cellulosic material designated 22 is corrugated to form a plurality of parallel ribs 23 separated by more compressed strips of cellulosic material 24. The material 22 is wrapped about tubing 19 so that the ribs 23 run axially of the tubing, and the ribs thereby form a series of channels 25 which extend axially of the tube 19. I have found that these channels, as described in more detail in my copending application Serial No. 237,554, filed October 28, 1938, afford particularly efficacious means for filtering an oil. However, my inventive concept is not confined to this particular type of filtering medium, and other materials, such as cotton waste, granular particles, etc., may be used, if desired.

The ribbed cellulosic sheet material is wrapped about the tube 19 until such tube and wrapping assume a predetermined diameter. This diameter is substantially that of the diameter of a cylindrical shell 26, which serves as a casing for the filtering material 22.

The casing 26 is provided with an imperforate disc 27 at one end which is suitably crimped onto the casing 26, as indicated at 28, or in any other suitable manner, and the tube 19 and filter material 22 are inserted in the casing until the tube 19 abuts against this disc. It will be noted that Figure 2 that the cellulosic material does not extend the full length of tube 19 and is so assembled upon the tube that the apertures 21, which are adjacent the end of the tube which abuts the disc 27, remain open and there is formed in effect a chamber 29 intermediate the disc 27 and the filtering material 22.

The end of the casing 26 opposite to the disc 27 is closed by a perforated disc 31 which abuts against the tube 19 and filtering material 22 and serves to hold the same in a fixed position within the casing 26. It will be noted that the disc 31 is crimped to the casing 26 or secured thereto in some other suitable manner.

The materials which may be used in construction of the filter cartridge are of course optional with the manufacturer, but, for the sake of economy and lightness, I have found that it is entirely satisfactory to make the tube 19 and the cylinder 26 of kraft paper and to form the discs 27 and 31 of relatively light metal. As stated, the filtering material is preferably ribbed cellulosic material.

It will be noted that the cartridge is of smaller diameter than the filler tube 6, and I have found it preferable to so locate the spindle member 18 that the cartridge is eccentric with respect to the filler tube. This is clearly shown in Figures 2 and 3. The method of installing the cartridge is believed to be apparent, for it is merely necessary to remove the cap 6A from the filler tube and then slide the filter cartridge along the wall of the filler tube 6 so that the spindle 18 will register with tube 19. As indicated above, the metal of the perforated disc 31 is very light, and is readily punctured by the quill 18. Of course, if desired, the hole in the disc 31 for registration with the tube 19 may be formed at the time the cartridge is manufactured.

The operation of my device is also believed to be obvious. Oil passes through line 4, joint 5 and into chamber 11 of member 9. Such oil may come directly from the pump, from a high pressure line from the pump, or from a distribution valve such as shown in Figure 1. In any event, all of the oil in chamber 11 passes out through tube 18 unless the pressure of the oil rises to a point where the valve 14 is opened and a portion of the oil thereby by-passed directly into the filler tube and crank case. The oil on emerging from quill 18 tends to fill the free length of tube 19 and to discharge through apertures 21 into the chamber 29 formed between the filter material and the solid disc 27. The oil then passes down through the channels 25 formed by the ribs of the filter material and thence through the apertures of the perforated disc 31 into the filler tube 6. From the filler tube 6 the oil returns to the crank case. It will be noted that notwithstanding the presence of the filter cartridge in the filler tube, this tube may still be used for the replenishing of oil in the lubricating system and permits the normal breathing function, due to the clearance between the filter cartridge and the filler tube. It will be understood of course that at any given time only a portion of the oil in the lubricating system passes through the filter, but inasmuch as there is a continuous circulation of oil through this filter, the entire mass of oil in the lubricating system is maintained in a relatively clean condition.

If it is desired to receive oil for the filter directly from the oil pump, or to otherwise avoid an oil line exterior of the motor, the arrangement shown in Figure 7, for instance, may be employed. In this figure, the member 9A receives oil through the tube 4A which, rather than extending on the outside of the motor to a distribution valve, extends down through the filler tube 6 and into the crank case to connect with the desired source of supply. In such a case, it is merely necessary to drill an additional threaded aperture 32 into the chamber 11A and at the bottom of such chamber. The tube 4A, suitably threaded at its end, may thereby be screwed into such threaded aperture. The open end of chamber 11A may be closed by a threaded plug 33. Otherwise the construction and operation of the valve 14 is similar to that described with reference to Figure 2.

It will be noted that my invention provides an effective filtering element which is inexpensive to manufacture, may be readily installed or replaced in an internal combustion engine, and which necessitates a minimum of space. By locating this element within the filler tube, no additional room is required for the filter, and at the same time the filler tube may perform its normal function in the filtering of oil and the breathing of the crank case.

While I have shown and described one embodiment of my invention, I wish it to be understood that I do not confine myself to the precise details herein set forth by way of illustration, as it is apparent that many changes and variations may be made therein, by those skilled in the art, without departing from the spirit of the invention, or exceeding the scope of the appended claims.

I claim:

1. In an engine having a crank case and a filling orifice therefor, a conventional filler tube in communication with the orifice, an enclosed filtering element mounted within the filler tube, said filtering element forming well defined channels extending longitudinally through said element, said channels permitting a relatively free flow of oil and adapted to remove suspended impurities from the oil in its passage therethrough the lower extremities of said channels directly communicating with the filler tube, and means to conduct a free flow of oil from the engine to the upper extremities of said element from which point the oil may flow through the channels where it is filtered and thence discharged into the filler tube.

2. In an engine having a crank case and a filling orifice therefor, a filler tube in communication with the orifice, a channeled member mounted transversely in the base of the filler tube, a tubular spindle member communicating with the channeled member, a conduit adapted to receive said spindle member for mounting the same within said filler tube, a filtering element positioned around said conduit, said element forming well defined channels extending longitudinally through said element, said channels permitting a relatively free flow of oil and adapted to remove suspended impurities from the oil in its passage therethrough the lower extremities of said channels directly communicating with said filler tube, enclosure means spaced from the upper ends of said channels and separating them and the conduit from the filler tube, means to introduce the oil from the engine to the channeled member and thence to the spindle member and conduit, and means for discharging the oil from the conduit into the space between the said enclosure and filtering element whereby a free flow of oil through the filter channels can be maintained.

3. In an engine having a crank case and a filling orifice therefor, a conventional filler tube in communication with the orifice, a channeled member mounted transversely in the base of the filler tube, a tubular spindle member communicating with the channeled member, a conduit adapted to receive said spindle member for mounting the same within said filler tube, a filtering element positioned around said conduit, said element forming well defined channels extending longitudinally through said element, said channels permitting a relatively free flow of oil and adapted to remove suspended impurities from the oil in its passage therethrough the lower extremities of said channels directly communicating with said filler tube, enclosure means spaced from the upper ends of said channels and separating them and the conduit from the filler tube, means to introduce the oil from the engine to the channeled member and thence to the spindle member and conduit, means for discharging the oil from the conduit into the space between the said enclosure and filtering element whereby a free flow of oil can be maintained, and a pressure relief means in the channeled member which is operable to by-pass oil from the channeled member directly to the filler tube.

4. In an engine having a crank case and a filling orifice therefor, a conventional filler tube in communication with the orifice, a channeled member mounted transversely in the base of the filler tube, a tubular spindle member communicating with the channeled member, a conduit adapted to receive said spindle member for mounting the same within said filler tube, a filtering element positioned around said conduit, said element forming well defined channels extending longitudinally through said element, said channels permitting a relatively free flow of oil and adapted to remove suspended impurities from the oil in its passage therethrough the lower extremities of said channels directly communicating with said filler tube, enclosure means spaced from the upper ends of said channels and separating them and the conduit from the filler tube, means to introduce the oil from the engine to the channeled member and thence to the spindle member and conduit, means for discharging the oil from the conduit into the space between the said enclosure and filtering element whereby a free flow of oil can be maintained, and a pressure relief means in the channeled member which is operable to by-pass oil from the channeled member directly to the filler tube, the said filtering element being eccentrically mounted with respect to the filler tube to form an oil passage through the tube having a cross-sectional area substantially equal to the cross-sectional area of the said orifice.

5. In an engine having a crank case, said crank case having a filling orifice therefor, a filler tube in communication with the orifice and inclined at an angle to the horizontal, a channeled member mounted transversely in the base of the filler tube and having communication therewith, a tubular spindle member communicating with the channeled member, a casing having an upper closure member and a lower perforated wall provided with a central aperture, a conduit extending from said closure to said wall and registering with said aperture, said conduit being adapted to receive said spindle for mounting the casing in the filler tube, a tubular filtering element positioned around said conduit and resting on the perforated wall, said element forming well defined channels extending longitudinally through said element, said channels permitting a relatively free flow of oil and adapted to remove suspended impurities from the oil in its passage therethrough means to introduce oil from the engine to the channeled member and thence to the spindle member and conduit, passages in the conduit communicating with the upper ends of the channels, and a pressure relief valve in the channeled member which is operable to by-pass oil from the channeled member to the filler tube when the pressure is raised above a predetermined amount whereby a free flow of oil can be maintained.

6. In an engine having a crank case, said crank case having a filling orifice therefor, a filler tube in communication with the orifice and inclined at an angle to the horizontal, a channeled member mounted transversely in the base of the filler tube and having communication therewith, a tubular spindle member communicating with the channeled member, a casing having an upper closure member and a lower perforated wall provided with a central aperture, a conduit extending from said closure to said wall and registering with said aperture, said conduit being adapted to receive said spindle for mounting the casing in the filler tube, a tubular filtering element positioned around said conduit, said element being formed of ribbed cellulosic material wrapped about the conduit with the ribs providing well defined channels extending longitudinally through said element, means to introduce oil from the engine to the channeled member and thence to the spindle member and conduit, passages in the conduit communuicating with a space above the upper ends of the channels, and a pressure relief valve in the channeled member which is operable to by-pass oil from the channeled member to the filler tube when the pressure is raised above a predetermined amount whereby a free flow of oil can be maintained, said casing being eccentrically mounted with respect to the filler tube to form an oil passage through the tube having a cross-sectional area substantially equal to the cross-sectional area of the said orifice.

SOUTHWICK W. BRIGGS.